US008636591B1

(12) United States Patent
Hawk et al.

(10) Patent No.: US 8,636,591 B1
(45) Date of Patent: Jan. 28, 2014

(54) SYSTEM AND METHOD FOR FACILITATING VIRTUAL ITEM REWARDS BASED ON A GAME OF CHANCE

(71) Applicant: Kabam, Inc., San Francisco, CA (US)

(72) Inventors: Travis Hawk, San Bruno, CA (US); Keith Kawahata, San Francisco, CA (US); Brian DeSanti, San Bruno, CA (US); Tim Ernst, Millbrae, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

(21) Appl. No.: 13/895,563

(22) Filed: May 16, 2013

(51) Int. Cl.
*A63F 9/24* (2006.01)
*A63F 13/00* (2006.01)

(52) U.S. Cl.
USPC .................. 463/29; 463/16; 463/20; 463/25; 463/26

(58) Field of Classification Search
USPC ................................................ 463/20, 29
See application file for complete search history.

(56) References Cited

U.S. PATENT DOCUMENTS

| | | | | |
|---|---|---|---|---|
| 4,067,121 | A | 1/1978 | Waszmer | 35/9 D |
| 6,190,255 | B1 | 2/2001 | Thomas et al. | 463/20 |
| 6,347,996 | B1 | 2/2002 | Gilmore et al. | 463/17 |
| 6,398,218 | B1 | 6/2002 | Vancura | 273/138.1 |
| 6,511,375 | B1 * | 1/2003 | Kaminkow | 463/20 |
| 7,153,205 | B2 * | 12/2006 | Baerlocher | 463/16 |
| 7,273,415 | B2 * | 9/2007 | Cregan et al. | 463/25 |
| 7,278,919 | B2 * | 10/2007 | Souza et al. | 463/25 |
| 7,303,469 | B2 * | 12/2007 | Kaminkow | 463/20 |
| 7,381,133 | B2 | 6/2008 | Thomas | 463/20 |
| 7,399,226 | B2 | 7/2008 | Mishra | 463/18 |
| 7,500,914 | B2 * | 3/2009 | Rodgers et al. | 463/20 |
| 7,614,953 | B2 * | 11/2009 | Souza et al. | 463/20 |
| 7,874,912 | B2 * | 1/2011 | Cregan et al. | 463/20 |
| 7,905,772 | B2 * | 3/2011 | Baerlocher et al. | 463/20 |
| 7,942,737 | B2 * | 5/2011 | Cregan et al. | 463/27 |
| 7,963,838 | B2 | 6/2011 | Gauselmann | 463/16 |
| 8,002,620 | B2 | 8/2011 | Nicely et al. | 463/16 |
| 8,210,937 | B2 * | 7/2012 | Cregan et al. | 463/27 |
| 8,251,800 | B2 | 8/2012 | Cannon | 463/21 |
| 8,303,395 | B2 * | 11/2012 | Pau et al. | 463/16 |
| 8,545,306 | B2 * | 10/2013 | Yoshikawa et al. | 463/20 |
| 2005/0054419 | A1 * | 3/2005 | Souza et al. | 463/20 |
| 2006/0116188 | A1 | 6/2006 | Blankstein | 463/16 |
| 2008/0026840 | A1 * | 1/2008 | Souza et al. | 463/31 |
| 2012/0157195 | A1 * | 6/2012 | Sum et al. | 463/29 |
| 2012/0231869 | A1 | 9/2012 | Englman et al. | 463/20 |
| 2012/0289322 | A1 | 11/2012 | Causley | 463/26 |
| 2012/0309487 | A1 | 12/2012 | Yoshikawa et al. | 463/20 |

* cited by examiner

*Primary Examiner* — Steven J Hylinski
(74) *Attorney, Agent, or Firm* — Pillsbury Winthrop Shaw Pittman LLP

(57) ABSTRACT

One aspect of the disclosure relates to facilitating virtual item rewards for implementation in a virtual space based on a game of chance in an online game. A virtual wheel with multiple game outcomes may be spun and/or any other action may be taken. One of multiple virtual outcomes corresponding to different game outcomes may be selected and/or displayed. There may be various visual mechanisms for selecting and/or presenting one outcome from multiple possible game outcomes.

20 Claims, 10 Drawing Sheets

SYSTEM AND METHOD FOR FACILITATING VIRTUAL ITEM REWARDS BASED ON A GAME OF CHANCE

FIELD

The disclosure relates to facilitating virtual item rewards based on a game of chance in an online game.

BACKGROUND

Various techniques for providing virtual items rewards in an online game are known. They may be triggered either through users collecting the items in a game, or they may be awarded based on user skill in a game. Conventional systems, however, suffer from various drawbacks. For example, conventional systems may fail to promote user excitement in obtaining virtual items. Alternatively, users with fewer skills may not be able to acquire virtual items as easily as users with greater skills.

SUMMARY

One aspect of the disclosure relates to facilitating virtual item rewards for implementation in a virtual space based on a game of chance in an online game. A virtual wheel with multiple game outcomes may be spun and/or any other action may be taken. One of multiple virtual outcomes corresponding to different game outcomes may be selected and/or displayed. There may be various visual mechanisms for selecting and/or presenting one outcome from multiple possible game outcomes. If the selected game outcome is a Fail, then the user may be given a Consolation Prize, the game may end, and/or other action may be taken. If the game outcome is a Money Round, then the user may be taken to a Money Round board, and/or other action may be taken. If the game outcome is a Jackpot, then the user may be given the Jackpot, the user may advance to the next round, the process may start over again until the user gets a Fail, a Money Round, a Jackpot, elects to accept a virtual item associated with a Game Item, and/or other action may be taken. If the game outcome is a Game Item, the user may be given the choice to either take a virtual item in the virtual space and end the game, or to give up the virtual item up and try again on the next row for a better prize, and/or other action may be taken. If the user advances to the next round, the process may start over again until the user gets a Fail, a Money Round, a Jackpot, elects to accept a virtual item associated with a Game Item, and/or other action may be taken.

One aspect of the disclosure relates to providing a computer-implemented method of facilitating virtual item rewards based on a game of chance. The method may be implemented on a computer system that includes one or more physical processors. The method may comprise executing an instance of a game space; implementing the instance of the game space to facilitate presentation of views of the game space to users, wherein the game space may be configured to facilitate interaction of the users with the game space and/or each other through operations performed in the instance of the game space in response to commands received from the users, wherein the users include a first user and/or any other user.

The method may comprise effectuating presentation of a secondary game interface to the first user to facilitate play by the first user of a secondary game. A level of the secondary game may be provided to the first user through the secondary game interface. Such provision may comprise one or more of:

(a) selecting an outcome from a set of outcomes for the level, wherein the set of outcomes may include one or more of a Fail outcome, a Money Round outcome, a Jackpot outcome, a Game Item outcome, and/or other outcomes; (b) causing the secondary game interface to present the selected outcome to the first user; (c) responsive to the outcome being the Fail outcome, providing a virtual item associated with the Fail outcome to the first user in the game space, ending the secondary game, and/or taking other action; (d) responsive to the selected outcome being the Money Round outcome, providing a Money Round game to the first user through the secondary game interface, and/or taking other action, wherein providing the Money Round game includes one or more of obtaining selection of value amounts from a set of potential value amounts, determining a total value amount corresponding to the selected value amounts by aggregating the selected value amounts, awarding virtual currency usable in the virtual space to the first user in the total value amount, providing a next level of the secondary game to the user through the secondary game interface, and/or taking other action; (e) responsive to the selected outcome being the Jackpot outcome, providing a virtual item associated with the Jackpot outcome to the first user in the game space, providing the next level of the secondary game to the user through the secondary game interface, and/or taking other action; and (f) responsive to the selected outcome being the Game Item outcome, providing, through the secondary game interface, an option associated with the Game Item outcome to the first user in the game space, and/or taking other action; and (i) responsive to reception of acceptance of the option by the first user through the secondary game interface, providing a virtual item associated with the Game Item outcome to the first user in the game space, ending the secondary game, and/or taking other action, or (ii) responsive to reception of rejection of the option by the first user through the secondary game interface, providing the next level of the secondary game to the user through the secondary game interface, and/or taking other action. Wherein providing the next level of the secondary game to the user through the secondary game interface may include performing one or more of operations (a) and (b) for the next level, performing an appropriate one of operations (c), (d), (e), and (f) for the next level, and/or taking other action.

In some implementations, providing the level of the secondary game comprises obtaining probabilities for individual ones of the outcomes in the set of outcomes for the level. In some implementations, selection of the outcome at operation (a) may be performed based on the determined probabilities for the individual outcomes and/or any other outcomes.

In some implementations, obtaining selection of value amounts from a set of potential value amounts may be acquired by automatic selection. In some implementations, obtaining selection of value amounts from a set of potential value amounts may be acquired by user selection. In some implementations, obtaining selection of value amounts from a set of potential value amounts may be acquired until a threshold number of selections may be met. In some implementations, the threshold number of selections may be 20 selections.

In some implementations, selecting the outcome at operation (a) may comprise selecting one or more outcomes displayed on an N×N board of outcomes. In some implementations, obtaining selection of value amounts from a set of potential value amounts may comprise displaying the revealing the value amounts, hiding the value amounts and shuffling the value amounts. In some implementations, accessing the next level may continue until a threshold maximum number of levels is met.

Another aspect of the disclosure relates to providing a system for facilitating virtual item rewards based on a game of chance. The system may comprise one or more processors configured to execute computer program modules, the computer program modules comprising: a game module configured to execute an instance of a game space, and to facilitate presentation of views of the game space to users, wherein the game space may be configured to facilitate interaction of the users with the game space and/or each other through operations performed in the instance of the game space in response to commands received from the users, and wherein the users include a first user and/or any other user.

In some implementations, a secondary user interface module may be configured to facilitate presentation of a secondary game interface to the first user to facilitate play by the first user of a secondary game.

In some implementations, a secondary game module may be configured to provide a level of the secondary game to the first user through the secondary game interface, such provision may comprise: (a) selecting an outcome from a set of outcomes for the level, wherein the set of outcomes may include one or more of a Fail outcome, a Money Round outcome, a Jackpot outcome, a Game Item outcome, and/or other outcomes; (b) causing the secondary game interface to present the selected outcome to the first user; (c) responsive to the outcome being the Fail outcome, providing a virtual item associated with the Fail outcome to the first user in the game space, ending the secondary game, and/or taking other action; (d) responsive to the selected outcome being the Money Round outcome, providing a Money Round game to the first user through the secondary game interface, and/or taking other action, wherein providing the Money Round game includes one or more of obtaining selection of value amounts from a set of potential value amounts, determining a total value amount corresponding to the selected value amounts by aggregating the selected value amounts, awarding virtual currency usable in the virtual space to the first user in the total value amount, providing a next level of the secondary game to the user through the secondary game interface, and/or taking other action; (e) responsive to the selected outcome being the Jackpot outcome, providing a virtual item associated with the Jackpot outcome to the first user in the game space, providing the next level of the secondary game to the user through the secondary game interface, and/or taking other action; and (f) responsive to the selected outcome being the Game Item outcome, providing, through the secondary game interface, an option associated with the Game Item outcome to the first user in the game space, and/or taking other action; and (i) responsive to reception of acceptance of the option by the first user through the secondary game interface, providing a virtual item associated with the Game Item outcome to the first user in the game space, ending the secondary game, and/or taking other action, or (ii) responsive to reception of rejection of the option by the first user through the secondary game interface, providing the next level of the secondary game to the user through the secondary game interface, and/or taking other action. Wherein providing the next level of the secondary game to the user through the secondary game interface may include performing one or more of operations (a) and (b) for the next level, performing an appropriate one of operations (c), (d), (e), and (f) for the next level, and/or taking other action.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
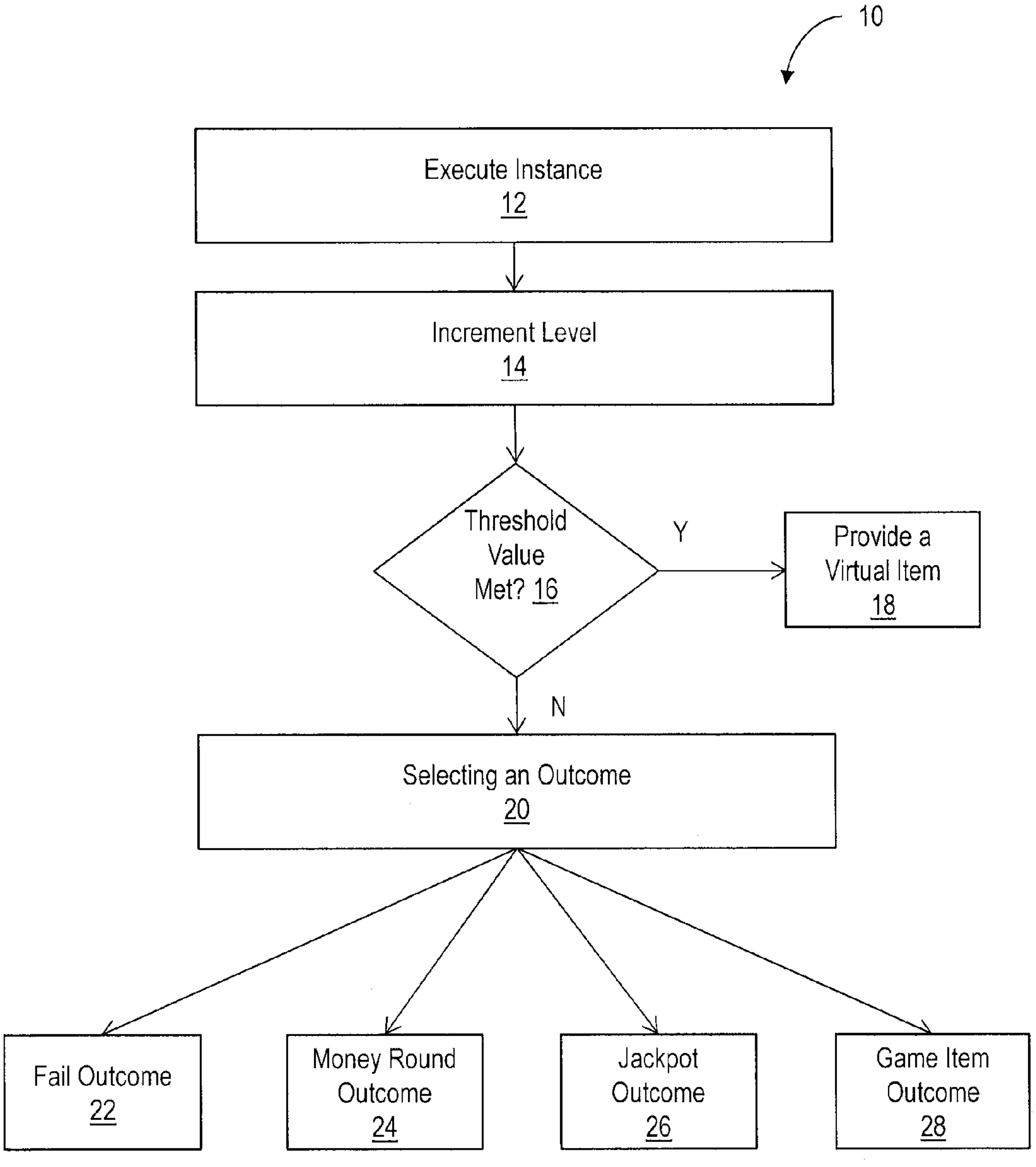
FIG. 1 illustrates an exemplary method configured to facilitate virtual item rewards based on a game of chance in an online game.

FIG. 1 illustrates a method 10 configured to facilitate virtual item rewards based on a game of chance in an online game. The operations of method 10 presented below are intended to be illustrative. In some implementations, method 10 may be accomplished with one or more additional operations not described, and/or without one or more of the operations discussed. Additionally, the order in which the operations of method 10 are illustrated in FIG. 1 and described below is not intended to be limiting.

In some implementations, method 10 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 10 in response to instructions stored electronically on an electronic storage medium. The one or more processing devices may include one or more devices configured through hardware, firmware, and/or software to be specifically designed for execution of one or more of the operations of method 10.

At an operation 12, an instance of a virtual space may be executed. In some implementations, operation 12 may be performed by implementing the instance of the game space to facilitate presentation of views of the game space to users. The game space may be configured to facilitate interaction of the users with the game space and/or each other through operations performed in the instance of the game space in response to commands received from the users. The users include a first user and/or any other user.

At operations 14 and 16, a level may be incremented in the game until a threshold level is met. In some implementations, providing the level of the secondary game comprises obtaining probabilities for individual ones of the outcomes in the set of outcomes for the level.

At operation 20, selection of the outcome at operation may be performed based on the determined probabilities for the individual outcomes. In some implementations, the Normal Phase may be what the user spends the majority of his/her time on. The Normal Phase may be the first part of the game that the user plays. The board may consist of N rows of N outcomes (e.g., representing N outcomes for the row). These items may be the prizes, and/or have other significance. Individual rows may include prizes, a Money Round, a Jackpot outcome, and/or other outcomes. In some implementations, there may be no Jackpot outcome in the first row. When a person starts playing, the Jackpot may increment up by X amount. The user may start on the first row and move up a row one at a time until the user either: claims the consolation prize, wins a Jackpot, goes to the Money Round, and/or claims an actual prize.

At operation 20, the method may comprise effectuating presentation of a secondary game interface to the first user to facilitate play by the first user of a secondary game. A level of the secondary game may be provided to the first user through the secondary game interface. At operations 22, 24, 26, and 28, the method may comprise: selecting an outcome from a set of outcomes for the level, wherein the set of outcomes may include one or more of a Fail outcome, a Money Round outcome, a Jackpot outcome, a Game Item outcome, and/or other outcomes, and causing the secondary game interface to present the selected outcome to the first user.

In some implementations, in a row, each outcome may have a predetermined % chance of being landed on. The different variables (e.g., N rows, N outcomes, increment amount X, etc.) may be obtained and/or determined by an administrator, based on user or server metrics, and/or accessed from storage. The payoff amounts corresponding to certain symbols in the basic game may be predetermined according to a table stored in system memory. The award amounts corresponding to certain outcomes of the game may be stored in system memory.

In some implementations, the chance may be randomly determined. In some implementations, outcomes may be determined by automatically computing selections of outcomes based upon probability data. The apparatus may select outcomes based on predetermined probability (e.g., set by the host) of each outcome. In some implementations, the apparatus may select outcomes based on a random determination.

At operation 18, if the threshold value is met, a virtual item may be awarded and collected by the user in an inventory. Any virtual award may be awarded to the user, and collected in an inventory.

The user maintains an inventory for the user's character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, etc.) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

The virtual awards may include, but are not limited to, virtual items, virtual resources, character attributes, and/or character skills. A virtual item may be an item that may be used in a virtual world to assist a user's character. Examples of virtual items include, but are not limited to, valuables (money, valuable metals or gems, etc.), weapons, spell components, defense components, and/or armor. A virtual resource may be a resource that may be used in the virtual world to create game attributes. Examples of virtual resources include wood, stone, herbs, water, ores, animals, monsters, bosses, NPCs, building materials, potions, etc. A character attribute may be any quality, trait, feature and/or characteristic a particular character may have. Character attributes may include, but are not be limited to: a character score, a virtual object, the physical appearance of a character, an emblem or mark, a synthetic voice, virtual currency, virtual help points or credits, the ability to join groups of other users at a later time, a score for subsequent matching of later game parameters, a relationship with another character, a genetic profile or makeup, a skill or skill level, and/or a ranking. Character skills may be game attributes inherent in or acquired by a user's character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other user characters.

Figure 2:
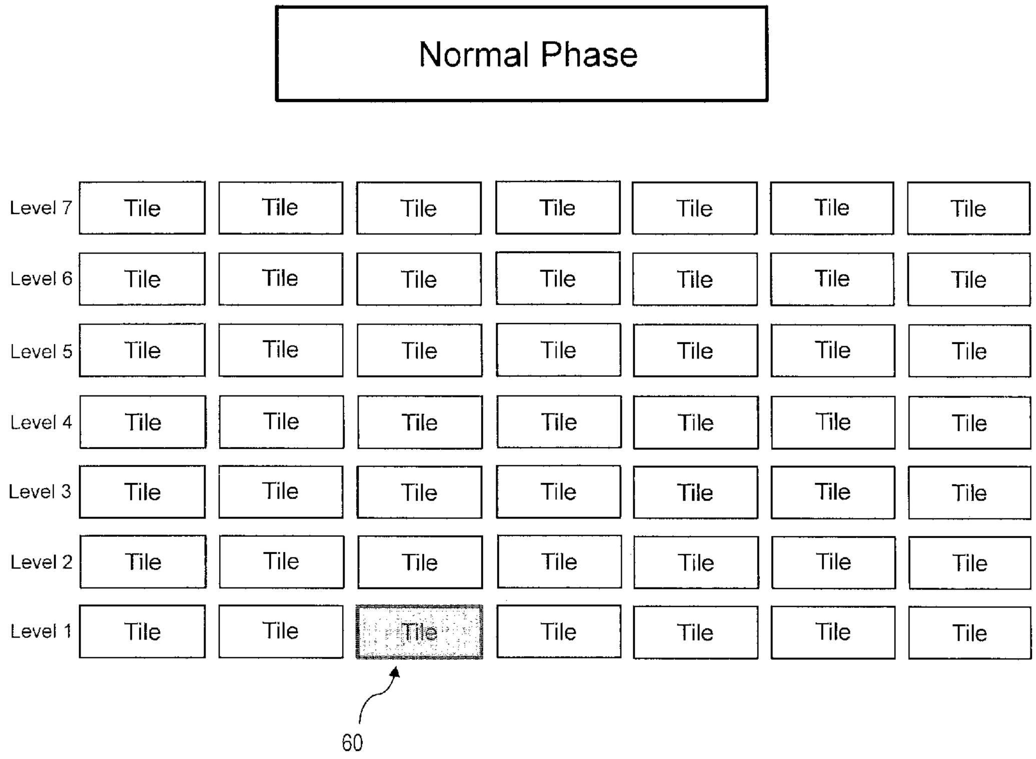
FIGS. 2 and 3 illustrate an exemplary implementation of a virtual space interface wherein a user is in the normal phase of the game.

FIG. 2 illustrates an exemplary virtual space in the normal phase. In some implementations, the game may be started with either free play and/or gems and/or any other method. A virtual wheel with multiple game outcomes may be spun. One of multiple virtual outcomes corresponding to different game outcomes may be selected and/or displayed. A variety of visual mechanisms for selecting and/or presenting one outcome from multiple possible game outcomes may be implemented. If the selected game outcome is a Fail, then the user may be given a Consolation Prize, the game may end, and/or other action may be taken. The consolation prize may be any virtual award as described above.

Figure 3:
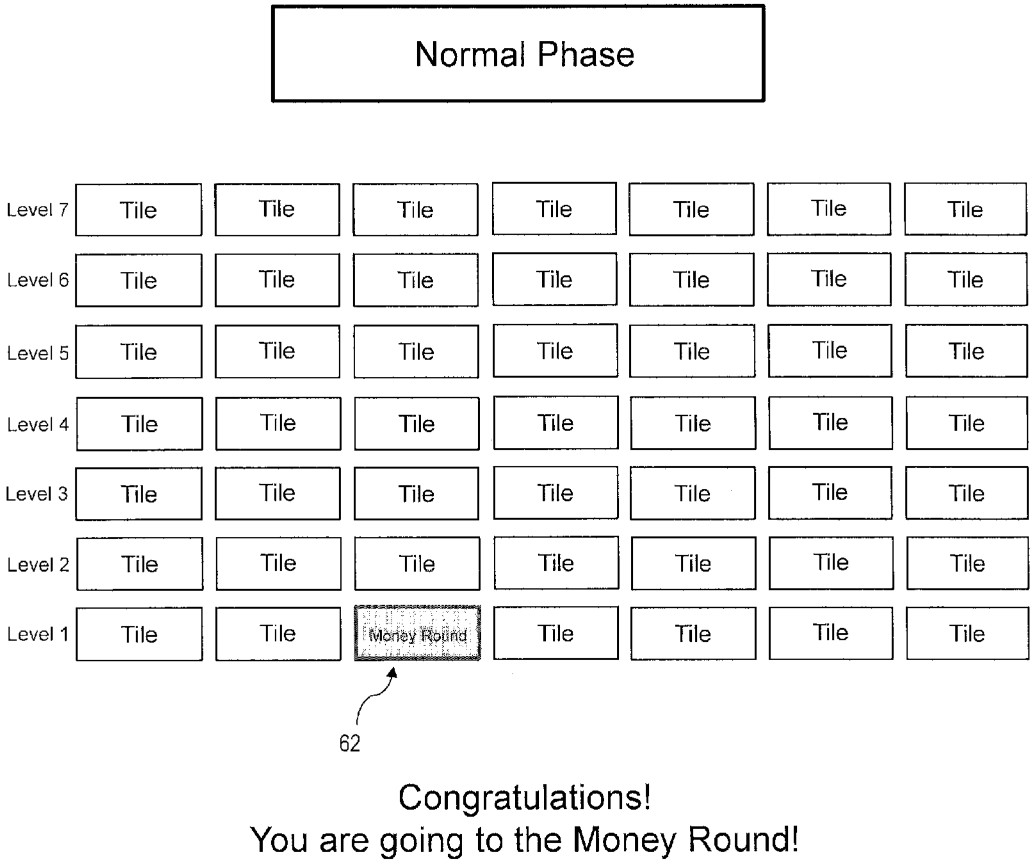

FIG. 3 illustrates an exemplary virtual space in the normal phase. In some implementations, if the game outcome is a Money Round 62, the user may be taken to a Money Round board and/or other action may be taken. If the game outcome is a Jackpot, then the user may be given the Jackpot (except in the case of row 1, which may have no Jackpot). The user may advance to the next round and the process may start over again until the user receives a Fail outcome, a Money Round outcome, a Jackpot outcome, elects to accept a virtual item associated with a Game Item outcome, and/or other action may be taken.

Figure 4:
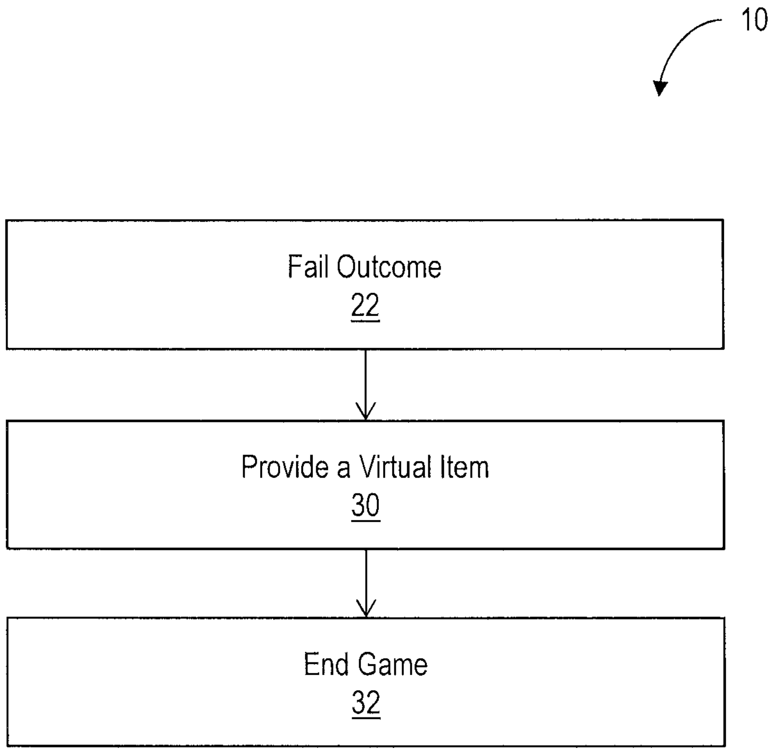
FIG. 4 illustrates a method configured to facilitate virtual item rewards based on a Fail outcome in an online game.

FIG. 4 illustrates a method 10 configured to facilitate virtual item rewards based on a Fail outcome in an online game. At operation 22, the method may comprise being responsive to the outcome being the Fail outcome and/or other outcomes. At operation 30, the method may provide a virtual item associated with the Fail outcome to the first user in the game space. In some implementations, if the outcome is a Fail outcome, the user may be given the consolation prize and the game ends and/or any other action may be taken. The consolation prize may be any virtual award as described above and/or any other award. At operation 32, the method may end the secondary game and/or any other action may be taken.

Figure 5:
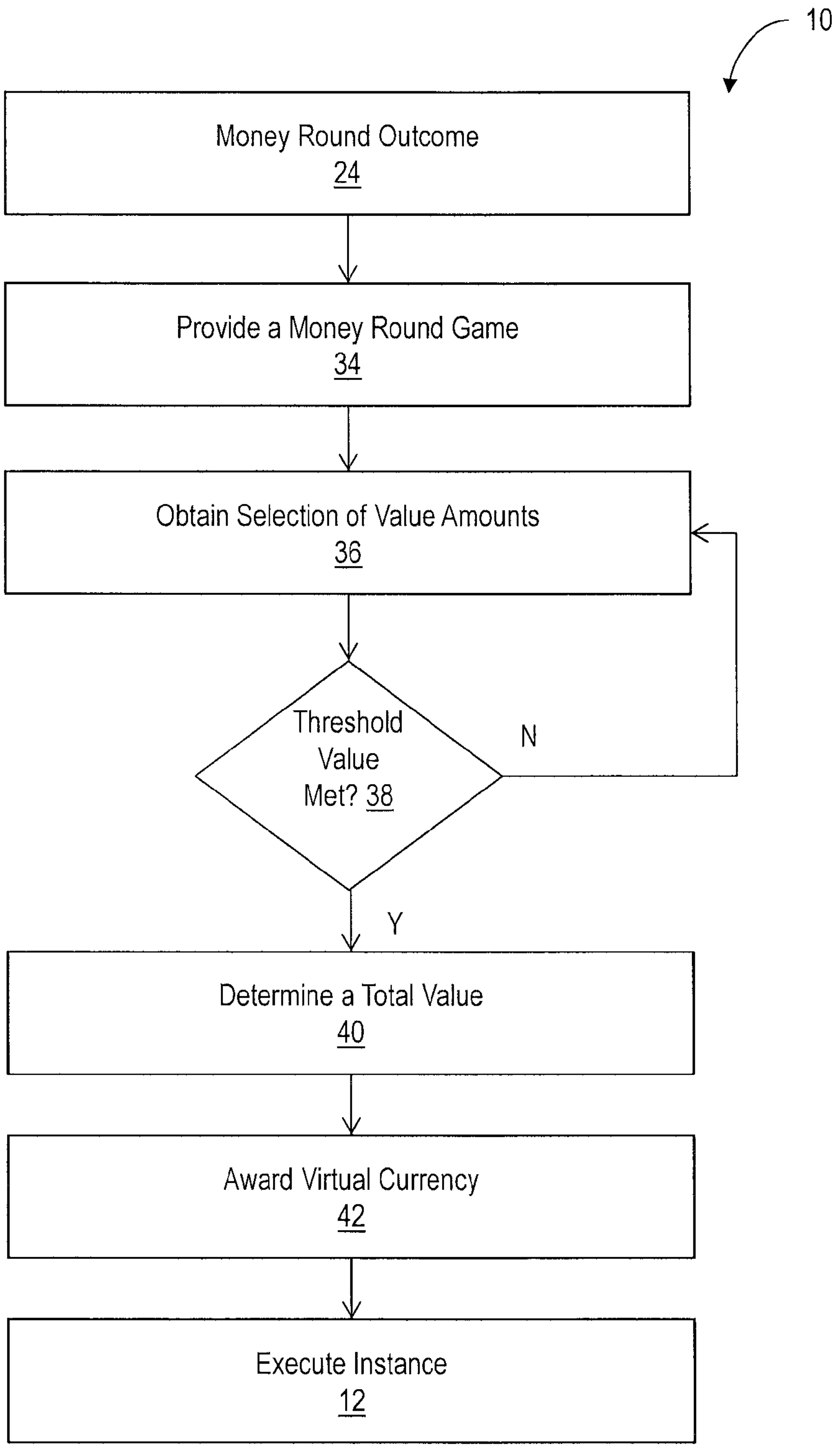
FIG. 5 illustrates a method configured to facilitate virtual item rewards based on a Money Round outcome in an online game.

FIG. 5 illustrates a method 10 configured to facilitate virtual item rewards based on a Money Round outcome in an online game. At operation 24, the method may comprise being responsive to the selected outcome being the Money Round outcome and/or any other outcome. At operation 34, the method may provide a Money Round game to the first user through the secondary game interface. At operation 36, providing the Money Round game may include obtaining a selection of value amounts from a set of potential value amounts. At operation 38, a determination may be made if the threshold number of outcomes has been selected. If the threshold has not been met, the game proceeds to operation 36 and/or any other action may be taken. If however, the threshold has been met, the game proceeds to operation 40 and/or any other action may be taken.

At operation 40, providing the Money Round game may include determining a total value amount corresponding to the selected value amounts by aggregating the selected value amounts and/or any other action may be taken. At operation 42, providing the Money Round game may include awarding virtual currency usable in the virtual space to the first user in the total value amount. The virtual currency may be any virtual award as described above and/or any other award. At operation 12, providing the Money Round game may include providing a next level of the secondary game to the user through the secondary game interface and/or any other action may be taken.

In some implementations, the user may select an auto-pick feature to obtain the selection of value amounts from a set of potential value amounts. The automatic selection corresponding to certain symbol selection in the basic game may be predetermined according to a table stored in system memory. The automatic selection may be randomly selected. In some implementations, outcomes may be determined by automatically computing selections of outcomes based upon probability data. The apparatus may select outcomes based on predetermined probability of each outcome.

In some implementations, obtaining selection of value amounts from a set of potential value amounts may be acquired by user selection. Obtaining selection of value amounts from a set of potential value amounts may be acquired until a threshold number of selections is met. In some implementations, the threshold number of selections may be 20 selections and/or any other number of selections.

In some implementations, selecting the outcome may comprise selecting one or more outcomes displayed on an N×N board of outcomes. In some implementations, obtaining selection of value amounts from a set of potential value amounts may comprise displaying the revealing the value amounts, hiding the value amounts and/or shuffling the value amounts. In some implementations, accessing the next level may continue until a threshold maximum number of levels are met and/or any other action may be taken.

Figure 6:
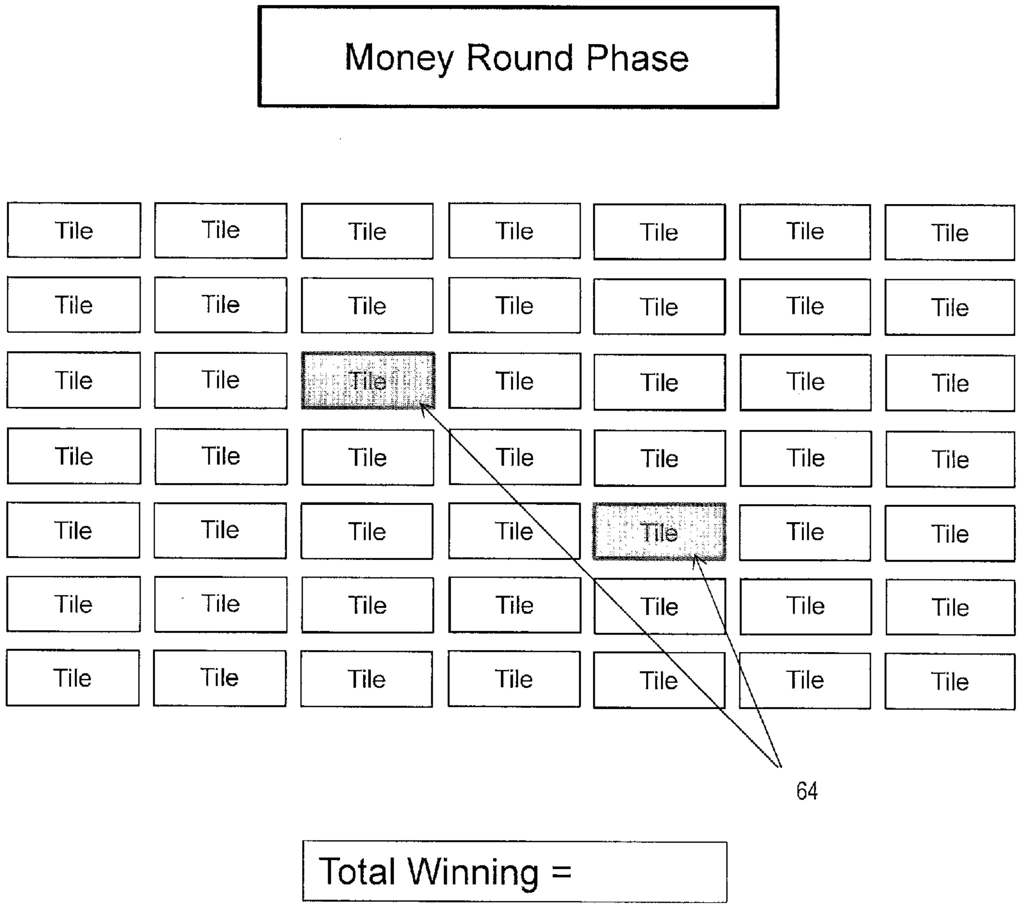
FIGS. 6 and 7 illustrate an exemplary implementation of a virtual space interface wherein a user is in the Money Round phase of the game.
Figure 7:
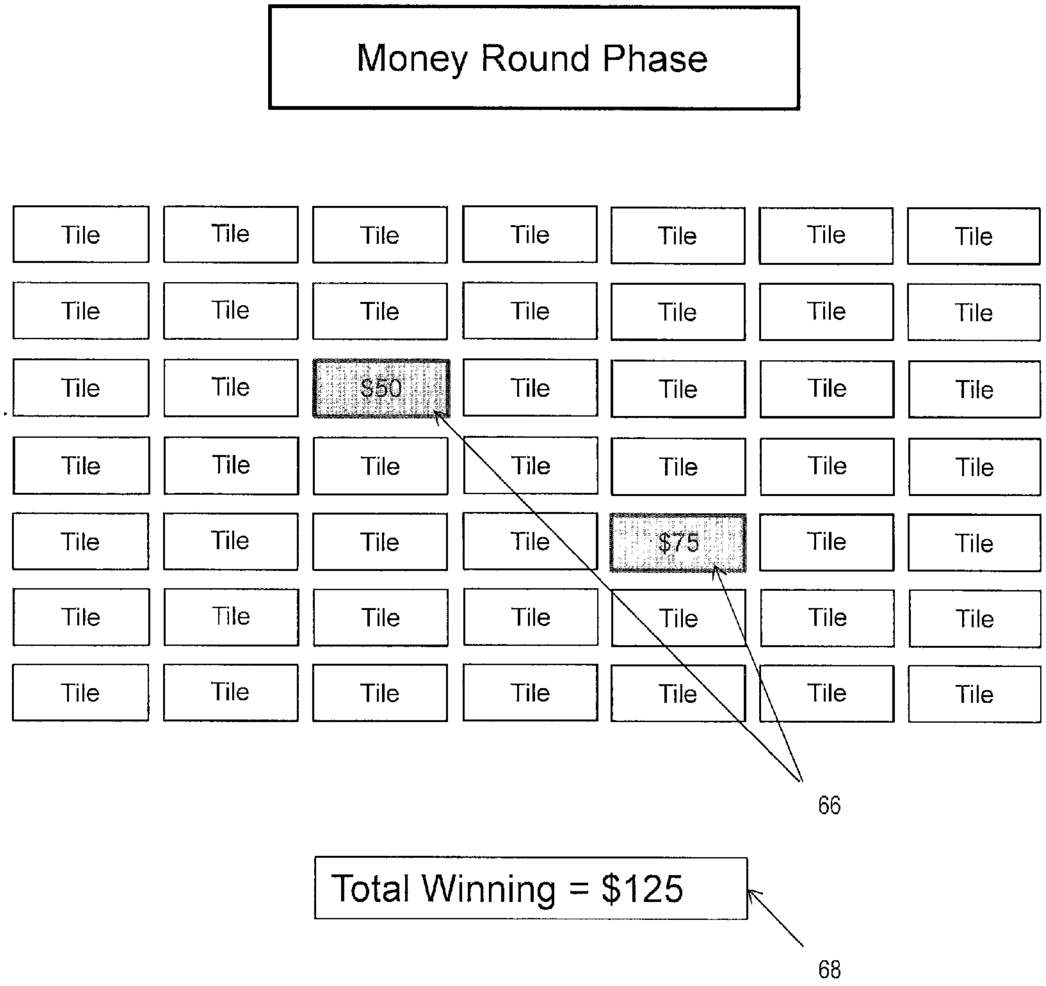

FIGS. 6 and 7 illustrate an exemplary implementation of a virtual space interface wherein a user is in the Money Round phase of the game. The Money Round phase may be entered when the user lands on the Money Round outcome during the Normal Phase. In some implementations, there may be a Total Winning section 68 on the game that lists the accumulated winnings during the Money Round. When the Money Round starts, a new game board (e.g., the 7×7 outcomes) may replace the existing game board and/or any other action may be taken. There may be any number of outcomes in the Money Round. In some implementations, the outcomes in this new 7×7 board may be numbered amounts of hard currency and may be shown face up. After a set amount of time, the outcomes may then flip face down and shuffle around the board until they arrange themselves in a 7×7 grid again. In some implementations, the user then picks 20 outcomes and/or any other number of outcomes. When picked, the outcome may flip face up and reveal the numbered amount it was hiding 66. The numbered amount may be added to the running total of Total Winning 68, and/or the round may end after the user picks X number of outcomes (e.g., 20).

In some implementations, the user may select "Auto-Pick" and the game may randomly choose the remaining outcomes needed to fulfill the 20 outcome requirement. Once the threshold value of outcomes is met, the total value of the outcomes may be determined and the user may be awarded virtual currency and/or any other award. In some implementations, once the round ends, the user may receive the amount in the "Total Winning" 68 as hard currency for reward. The hard currency may be any virtual award as described above and/or any other award. In some implementations, the game may then end and the user may start over from the beginning of the Normal Phase and/or any other action may be taken.

Figure 8:
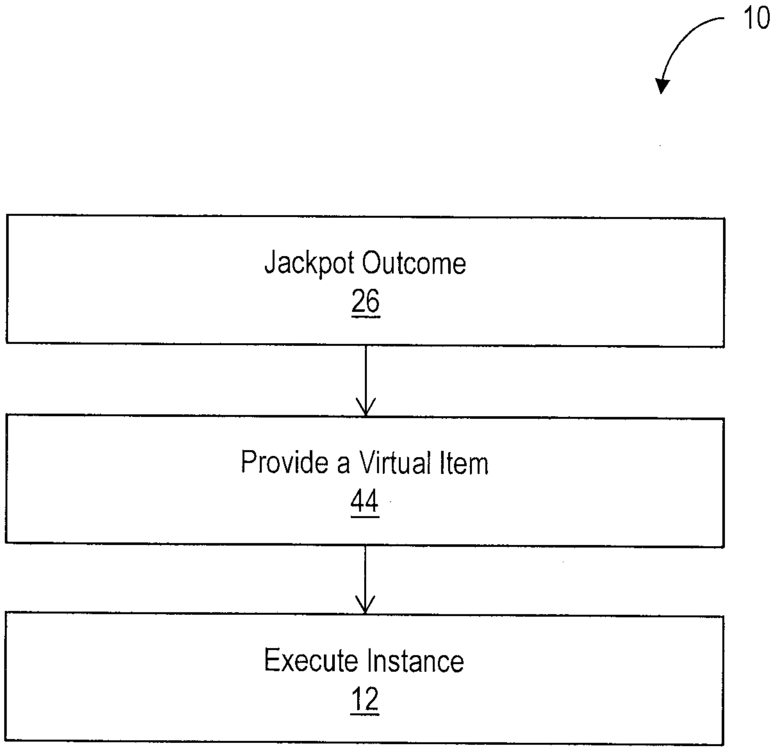
FIG. 8 illustrates a method configured to facilitate virtual item rewards based on a Jackpot outcome in an online game.

FIG. 8 illustrates a method configured to facilitate virtual item rewards based on a Jackpot outcome in an online game. At operation 26, the method may comprise being responsive to the selected outcome being the Jackpot outcome and/or any other outcome. At operation 44, the method may comprise providing a virtual item associated with the Jackpot outcome to the first user in the game space. The virtual item may be any virtual award as described above. At operation 12, the method may comprise providing the next level of the secondary game to the user through the secondary game interface and/or any other action may be taken.

In some implementations, the Jackpot phase may be entered when the user lands on the Jackpot outcome during the Normal Phase. When a user lands on the Jackpot outcome, the user may receive a payout of the current jackpot amount and/or any other action may be taken. The current jackpot amount may be displayed in the top right corner and/or any other place on the user interface. After the payout, the user may increment a level, and/or start over from the beginning of the Normal Phase and/or any other action may be taken. The jackpot may be reset back to its original starting value and/or any other action may be taken.

Figure 9:
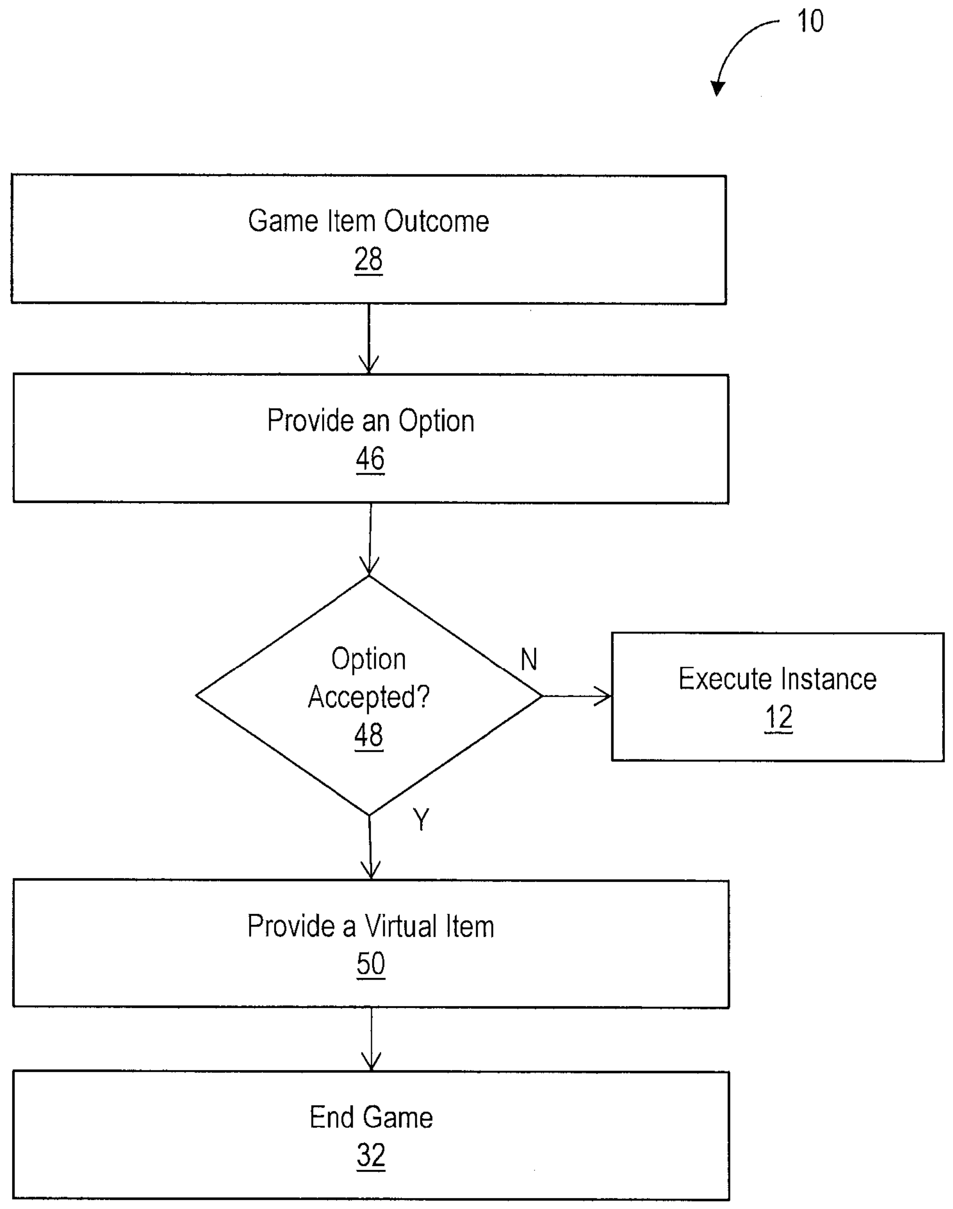
FIG. 9 illustrates a method configured to facilitate virtual item rewards based on a Game Item outcome in an online game.

FIG. 9 illustrates a method configured to facilitate virtual item rewards based on a Game Item outcome in an online game. At operation 28, the method may comprise being responsive to the selected outcome being the Game Item outcome and/or any other outcome. At operation 46, the method may comprise providing, through the secondary game interface, an option associated with the Game Item outcome to the first user in the game space and/or any other action may be taken. At operations 48 and 50, the method in response to reception of acceptance of the option by the first user through the secondary game interface, may provide a virtual item associated with the Game Item outcome to the first user in the game space 50 and/or any other action may be taken. At operation 32, the method may comprise ending the secondary game and/or any other action may be taken. The virtual item may be any virtual award as described above. In some implementations, at operation 46, the method may comprise providing, through the secondary game interface, an option associated with the Game Item outcome to the first user in the game space and responsive to reception of rejection of the option by the first user through the secondary game interface and/or any other action may be taken. At operation 12, the method may comprise providing the next level of the secondary game to the user through the secondary game interface and/or any other action may be taken.

If the game outcome is a Game Item, the user may be given the choice to either take a virtual item in the virtual space and end the game, or to give up the virtual item up and try again on the next row for a better prize, and/or other action may be taken. If the user advances to the next round, the process may start over again until the user gets a Fail outcome, a Money Round outcome, a Jackpot outcome, elects to accept a virtual item associated with a Game Item, and/or other action may be implemented. In some implementations, if the outcome is a Game Item, the user may be given the choice to either take the item and end the game, or to give it up and try again on the next row for a better prize. In some implementations, if the user advances to the next row, the process starts over again until the user gets a Fail, a Money Round, and/or a Jackpot.

Figure 10:
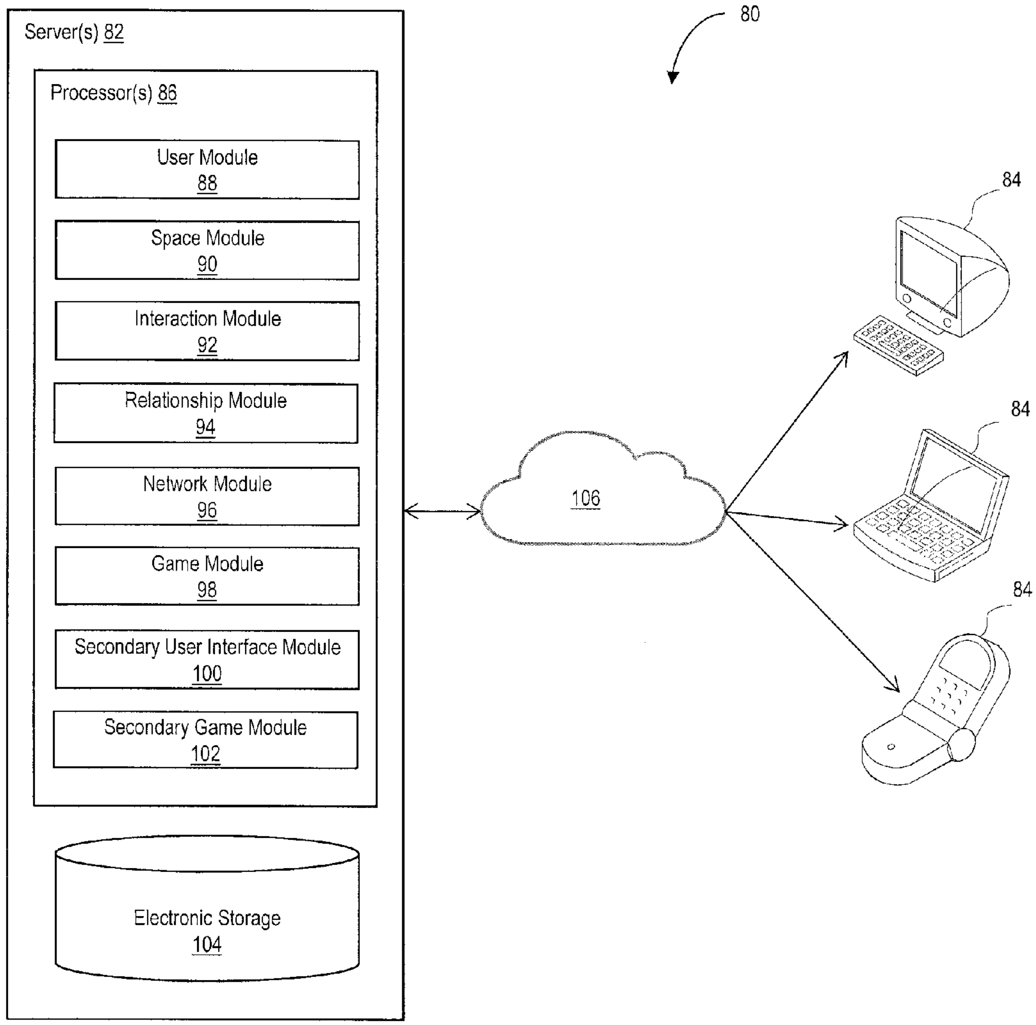
FIG. 10 illustrates an exemplary system configured to facilitate virtual item rewards based on a game of chance in an online game.

FIG. 10 illustrates an exemplary system configured to facilitate virtual item rewards based on a game of chance in an online game. Any of the operations above (shown in FIGS. 1, 4, 5, 8 and 9, and described above) may be performed by any of the modules illustrated in FIG. 10.

In some implementations, system 80 may include a game server 82. The game server 82 may host a game space in which an online game takes place. The game server 82 may be configured to communicate with one or more client computing platforms 84 according to a client/server architecture. The users may access system 80 and/or the virtual space via client computing platforms 84.

The game server 82 may be configured to execute one or more computer program modules. The computer program modules may include one or more of a user module 88, a space module 90, an interaction module 92, a relationship module 94, a network module 96, a game module 98, a secondary user interface module 100, a secondary game module 102, and/or other modules.

The user module 88 may be configured to access and/or manage one or more user profiles and/or user information associated with users of the system 80. The one or more user profiles and/or user information may include information stored by game server 82, one or more of the client computing platforms 84, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

Space module 90 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space.

Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 90. Expressions of the instance executed on the clients may include space logic that effectively provides for execution of a limited version of the instance on a client that is synchronized and/or verified with state information received from space module 90. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that may be accessible by users via clients (e.g., client computing platforms 84) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 90 is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space may be contemplated.

Within the instance of the virtual space executed by space module 90, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it may be associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user may use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 84. The users may interact with each other through communications exchanged within the virtual space. Such communications may include one or more of textual chat, instant messages, private messages, voice communications, and/or other communications. Communications may be received and entered by the users via respective client computing platforms 84. Communications may be routed to and from the appropriate users through game server 82 (e.g., through space module 90).

The interaction module 92 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 92 in monitoring the interactions of the users may be stored to the user profiles managed by user module 88.

At a given time, interaction module 92 may determine a set of users that may be currently engaged with the virtual space and/or a set of users that may currently not be engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module 92 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The relationship module 94 may be configured to establish relationships between users within the virtual space. Such relationships may include one or more of friendships, guilds (with guild-mates), alliances, connections, followers, and/or other relationships. The relationship module 94 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships of a social construct within the virtual space that does not have a functional result.

The game module 98 may be configured to execute an instance of a game space, and to facilitate presentation of views of the game space to users, wherein the game space may be configured to facilitate interaction of the users with the game space and/or each other through operations performed in the instance of the game space in response to commands received from the users, and wherein the users include a first user.

The secondary user interface module 100 may be configured to facilitate presentation of a secondary game interface to the first user to facilitate play by the first user of a secondary game.

The secondary game module 102 may be configured to provide a level of the secondary game to the first user through the secondary game interface. Such provision may comprise one or more of: (a) selecting an outcome from a set of outcomes for the level, wherein the set of outcomes may include one or more of a Fail outcome, a Money Round outcome, a Jackpot outcome, a Game Item outcome, and/or other outcomes; (b) causing the secondary game interface to present the selected outcome to the first user; (c) responsive to the outcome being the Fail outcome, providing a virtual item associated with the Fail outcome to the first user in the game space, ending the secondary game, and/or taking other action; (d) responsive to the selected outcome being the Money Round outcome, providing a Money Round game to the first user through the secondary game interface, and/or taking other action, wherein providing the Money Round game includes one or more of obtaining selection of value amounts from a set of potential value amounts, determining a total value amount corresponding to the selected value amounts by aggregating the selected value amounts, awarding virtual currency usable in the virtual space to the first user in the total value amount, providing a next level of the secondary game to the user through the secondary game interface, and/or taking other action; (e) responsive to the selected outcome being the Jackpot outcome, providing a virtual item associated with the Jackpot outcome to the first user in the game space, providing the next level of the secondary game to the user through the secondary game interface, and/or taking other action; and (f) responsive to the selected outcome being the Game Item outcome, providing, through the secondary game interface, an option associated with the Game Item outcome to the first user in the game space, and/or taking other action; and (i) responsive to reception of acceptance of the option by the first user through the secondary game interface, providing a virtual item associated with the Game Item outcome to the first user in the game space, ending the secondary game, and/or taking other action, or (ii) responsive to reception of rejection of the option by the first user through the secondary game interface, providing the next level of the secondary game to the user through the secondary game interface, and/or taking other action. Wherein providing the next level of the secondary game to the user through the secondary game interface may include performing one or more of operations (a) and (b) for the next level, performing an appropriate one of operations (c), (d), (e), and (f) for the next level, and/or taking other action.

Network module 96 of the game server 82 may be configured to maintain a connection to the one or more client computing platforms 84. For example, the network module 96 may maintain one or more communication lines or ports to enable connection and/or exchange of information with a network 40 and/or other computing platforms 84. Information such as state information, game state and game logic may be communicated via network module 96. The network module may be configured to receive information from the client computing platform 84 as well.

The game server 82, client computing platforms 84, and/or external resources may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game servers 82, client computing platforms 84, and/or external resources may be operatively linked via some other communication media.

Game server 82 may include electronic storage 104, one or more processors 86, and/or other components. Game server 82 may include communication lines, or ports to enable the exchange of information with a network 46 and/or other computing platforms 84. Illustration of game server 82 in FIG. 10 is not intended to be limiting. Game server 82 may include a plurality of hardware, software, and/or firmware components operating together to provide the functionality attributed herein to game server 82. For example, game server 82 may be implemented by a cloud of computing platforms operating together as game server 82.

Electronic storage 104 may comprise non-transitory storage media that electronically stores information. The electronic storage media of electronic storage 104 may include one or both of system storage that is provided integrally (i.e., substantially non-removable) with game server 82 and/or removable storage that is removably connectable to game server 82 via, for example, a port (e.g., a USB port, a firewire port, etc.) or a drive (e.g., a disk drive, etc.). Electronic storage 104 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 104 may include one or more virtual storage resources (e.g., cloud storage, a virtual private network, and/or other virtual storage resources). Electronic storage 104 may store software algorithms, information determined by processor 86, information received from game server 82, information received from client computing platforms 84, and/or other information that enables game server 82 to function as described herein.

Processor(s) 86 is configured to provide information processing capabilities in game server 82. As such, processor 86 may include one or more of a digital processor, an analog processor, a digital circuit designed to process information, an analog circuit designed to process information, a state machine, and/or other mechanisms for electronically processing information. Although processor 86 is shown in FIG. 10 as a single entity, this is for illustrative purposes only. In some implementations, processor 86 may include a plurality of processing units. These processing units may be physically located within the same device, or processor 86 may represent processing functionality of a plurality of devices operating in coordination. The processor 86 may be configured to execute modules 88, 90, 92, 94, 96, 98, 100, and 102. Processor 86 may be configured to execute modules 88, 90, 92, 94, 96, 98, 100, and 102 by software; hardware; firmware; some combination of software, hardware, and/or firmware; and/or other mechanisms for configuring processing capabilities on processor 86. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 88, 90, 92, 94, 96, 98, 100, and 102 are illustrated in FIG. 10 as being implemented within a single processing unit, in implementations in which processor includes multiple processing units, one or more of modules 88, 90, 92, 94, 96, 98, 100, and 102 may be implemented remotely from the other modules. The description of the functionality provided by the different modules 88, 90, 92, 94, 96, 98, 100, and 102 described below is for illustrative purposes, and is not intended to be limiting, as any of modules 88, 90, 92, 94, 96, 98, 100, and 102 may provide more or less functionality than is described. For example, one or more of modules 88, 90, 92, 94, 96, 98, 100, and 102 may be eliminated, and some or all of its functionality may be provided by other ones of modules 88, 90, 92, 94, 96, 98, 100, and 102. As another example, processor 86 may be configured to execute one or more additional modules that may perform some or all of the functionality attributed below to one of modules 88, 90, 92, 94, 96, 98, 100, and 102.

A given client computing platform 84 may include one or more processors configured to execute computer program modules. The computer program modules may be configured to enable an expert or user associated with the given client computing platform 84 to interface with system 80, game server 82, and/or external resources, and/or provide other functionality attributed herein to client computing platforms 84. By way of non-limiting example, the given client computing platform 84 may include one or more of a desktop computer, a laptop computer, a handheld computer, a tablet computing platform, a NetBook, a Smartphone, a gaming console, and/or other computing platforms.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation may be combined with one or more features of any other implementation.

What is claimed is:

1. A computer-implemented method of facilitating virtual item rewards based on a game of chance, the method being implemented on a computer system that includes one or more physical processors, the method comprising:

executing an instance of a game space;

implementing the instance of the game space to facilitate presentation of views of the game space to users, wherein the game space is configured to facilitate interaction of the users with the game space and/or each other through operations performed in the instance of the game space in response to commands received from the users, and wherein the users include a first user;

effectuating presentation of a secondary game interface to the first user to facilitate play by the first user of a secondary game;

providing a level of the secondary game to the first user through the secondary game interface, such provision comprising:

(a) selecting an outcome from a set of outcomes for the level, wherein the set of outcomes include a Fail outcome, a Money Round outcome, a Jackpot outcome, and a Game Item outcome;

(b) causing the secondary game interface to present the selected outcome to the first user;

(c) responsive to the outcome being the Fail outcome, providing a virtual item associated with the Fail outcome to the first user in the game space, and ending the secondary game;

(d) responsive to the selected outcome being the Money Round outcome, providing a Money Round game to the first user through the secondary game interface, wherein providing the Money Round game includes obtaining selection of value amounts from a set of potential value amounts, determining a total value amount corresponding to the selected value amounts by aggregating the selected value amounts, and awarding virtual currency usable in the virtual space to the first user in the total value amount, and providing a next level of the secondary game to the user through the secondary game interface;

(e) responsive to the selected outcome being the Jackpot outcome, providing a virtual item associated with the Jackpot outcome to the first user in the game space, providing the next level of the secondary game to the user through the secondary game interface; and (f) responsive to the selected outcome being the Game Item outcome, providing, through the secondary game interface, an option associated with the Game Item outcome to the first user in the game space; and (i) responsive to reception of acceptance of the option by the first user through the secondary game interface, providing a virtual item associated with the Game Item outcome to the first user in the game space, and ending the secondary game, or (ii) responsive to reception of rejection of the option by the first user through the secondary game interface, providing the next level of the secondary game to the user through the secondary game interface; and wherein providing the next level of the secondary game to the user through the secondary game interface includes performing operations (a) and (b) for the next level, and performing an appropriate one of operations (c), (d), (e), and (f) for the next level.

2. The method of claim 1, wherein providing the level of the secondary game further comprising obtaining probabilities for individual ones of the outcomes in the set of outcomes for the level.

3. The method of claim 2, wherein selection of the outcome at operation (a) is performed based on the determined probabilities for the individual outcomes.

4. The method of claim 1, wherein obtaining selection of value amounts from a set of potential value amounts is acquired by automatic selection.

5. The method of claim 1, wherein obtaining selection of value amounts from a set of potential value amounts is acquired by user selection.

6. The method of claim 1, wherein obtaining selection of value amounts from a set of potential value amounts is acquired until a threshold number of selections is met.

7. The method of claim 6, wherein the threshold number of selections is 20 selections.

8. The method of claim 1, wherein selecting the outcome at operation (a) comprises selecting one or more outcomes displayed on an N×N board of outcomes.

9. The method of claim 1, wherein obtaining selection of value amounts from a set of potential value amounts comprises displaying the revealing the value amounts, hiding the value amounts and shuffling the value amounts.

10. The method of claim 1, wherein accessing the next level continues until a threshold maximum number of levels is met.

11. A system for a game of chance, the system comprising:

one or more processors configured to execute computer program modules, the computer program modules comprising:

a game module configured to execute an instance of a game space, and to facilitate presentation of views of the game space to users, wherein the game space is configured to facilitate interaction of the users with the game space and/or each other through operations performed in the instance of the game space in response to commands received from the users, and wherein the users include a first user;

a secondary user interface module configured to facilitate presentation of a secondary game interface to the first user to facilitate play by the first user of a secondary game;

a secondary game module configured to provide a level of the secondary game to the first user through the secondary game interface, such provision comprising:

(a) selecting an outcome from a set of outcomes for the level, wherein the set of outcomes include a Fail outcome, a Money Round outcome, a Jackpot outcome, and a Game Item outcome;

(b) causing the secondary game interface to present the selected outcome to the first user;

(c) responsive to the outcome being the Fail outcome, providing a virtual item associated with the Fail outcome to the first user in the game space, and ending the secondary game;

(d) responsive to the selected outcome being the Money Round outcome, providing a Money Round game to the first user through the secondary game interface, wherein providing the Money Round game includes obtaining selection of value amounts from a set of potential value amounts, determining a total value amount corresponding to the selected value amounts by aggregating the selected value amounts, and awarding virtual currency usable in the virtual space to the first user in the total value amount, and providing a next level of the secondary game to the user through the secondary game interface;

(e) responsive to the selected outcome being the Jackpot outcome, providing a virtual item associated with the Jackpot outcome to the first user in the game space, providing the next level of the secondary game to the user through the secondary game interface; and (f) responsive to the selected outcome being the Game Item outcome, providing, through the secondary game interface, an option associated with the Game Item outcome to the first user in the game space; and (i) responsive to reception of acceptance of the option by the first user through the secondary game interface, providing a virtual item associated with the Game Item outcome to the first user in the game space, and ending the secondary game, or (ii) responsive to reception of rejection of the option by the first user through the secondary game interface, providing the next level of the secondary game to the user through the secondary game interface; and wherein providing the next level of the secondary game to the user through the secondary game interface includes performing operations (a) and (b) for the next level, and performing an appropriate one of operations (c), (d), (e), and (f) for the next level.

12. The system of claim 11, wherein providing the level of the secondary game further comprising obtaining probabilities for individual ones of the outcomes in the set of outcomes for the level.

13. The system of claim 12, wherein selection of the outcome at operation (a) is performed based on the determined probabilities for the individual outcomes.

14. The system of claim 11, wherein obtaining selection of value amounts from a set of potential value amounts is acquired by automatic selection.

15. The system of claim 11, wherein obtaining selection of value amounts from a set of potential value amounts is acquired by user selection.

16. The system of claim 11, wherein obtaining selection of value amounts from a set of potential value amounts is acquired until a threshold number of selections is met.

17. The system of claim 16, wherein the threshold number of selections is 20 selections.

18. The system of claim 11, wherein selecting the outcome at operation (a) comprises selecting one or more outcomes displayed on an N×N board of outcomes.

19. The system of claim 11, wherein obtaining selection of value amounts from a set of potential value amounts comprises displaying the revealing the value amounts, hiding the value amounts and shuffling the value amounts.

20. The system of claim 11, wherein accessing the next level continues until a threshold maximum number of levels is met.

* * * * *